UNITED STATES PATENT OFFICE.

WALTER E. ROHNER, OF NEW YORK, N. Y.

WOOD-POLISHING COMPOUND.

SPECIFICATION forming part of Letters Patent No. 498,961, dated June 6, 1893.

Application filed September 13, 1892. Serial No. 445,814. (No specimens.)

*To all whom it may concern:*

Be it known that I, WALTER E. ROHNER, of the city, county, and State of New York, have invented a new and useful Wood-Polishing Compound; and I do hereby declare that the following is a full and exact description thereof.

The object of my invention is to produce a thoroughly efficient substitute for rotten stone for polishing fine furniture, and my invention consists in the compound hereinafter described.

My improved compound is intended to be applied directly to the surface of the material to be treated and results in a fine, hard polish at the expenditure of a very small amount of labor which would be necessary in polishing with rotten stone and without the necessity of applying subsequently some other material to clean off the rotten stone.

My improved polish or substitute for rotten stone is composed of turpentine, or turpentine and benzine, sulphur, common salt, and oil. The proportions of these ingredients may be varied widely according to the nature of the material to be treated or the effect to be produced, but for ordinary purposes I take for each gallon of the compound to be produced about seventy fluid ounces of benzine, forty fluid ounces of turpentine, four ounces of sulphur, one pint of raw linseed oil or other suitable oil, and one ounce of common salt. The turpentine and benzine are suitably refined and mixed together. The sulphur and oil are boiled together until the sulphur is melted and thoroughly mixed with the oil when a pint of the turpentine and benzine mixture is stirred in to thin the mixture of sulphur and oil. The salt is mixed with hot water sufficient to dissolve it. All the ingredients are now poured together into a closed vessel and agitated until thoroughly mixed. The compound is then allowed to stand until it has settled when the clear liquid is drawn from the top and is ready to use.

The sulphur and oil boiled together make a sort of gum which is held in solution or suspension by the other ingredients of the compound until it is applied to the surface to be polished; the gum is then deposited upon the surface and quickly becomes hard and acquires a gloss under rubbing.

For some uses it may be considered desirable to add to the compound a small portion of muriatic acid but the compound is complete and useful without it.

The compound may be applied to the surface to be polished in any convenient manner, as with a wadded pad, and rubbed upon it until the desired polish is attained. It will be found that the polish produced is not only very brilliant but is more durable than a rotten stone polish as well as very much less expensive.

I claim as my invention—

The herein described compound for use in polishing as a substitute for rotten stone, the same consisting of oil and sulphur boiled together, turpentine and salt, in substantially the proportions specified.

In testimony whereof I have signed my name to this specification in the presence of two subscribing witnesses.

WALTER E. ROHNER.

Witnesses:
A. N. JESBERA,
W. B. GREELEY.